March 22, 1938.  G. GYGER  2,112,019
PEDAL ARRANGEMENT FOR THE CONTROL OF THE GAS ADMISSION
AND THE BRAKES IN MOTOR VEHICLES
Filed Oct. 20, 1936

INVENTOR
GUSTAV GYGER
BY Young, Emery & Thompson
ATTORNEYS

Patented Mar. 22, 1938

2,112,019

UNITED STATES PATENT OFFICE 2,112,019

PEDAL ARRANGEMENT FOR THE CONTROL OF THE GAS ADMISSION AND THE BRAKES IN MOTOR VEHICLES

Gustav Gyger, Bienne, Switzerland

Application October 20, 1936, Serial No. 106,657
In Switzerland August 8, 1936

2 Claims. (Cl. 192—3)

The present invention relates to a pedal arrangement for motor vehicles and particularly to an arrangement in which one single lever is provided for the brake- and the gas-control, the brake being operated by swinging the pedal in a longitudinal vertical plane, while the control of the gas admission is operated by swinging the pedal in a transverse direction of said plane.

Figure 1:
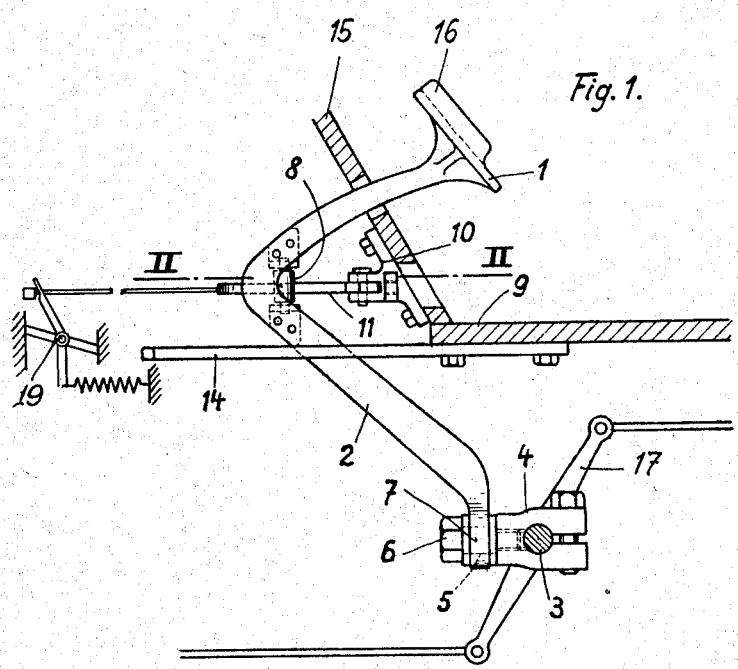
Figure 2:
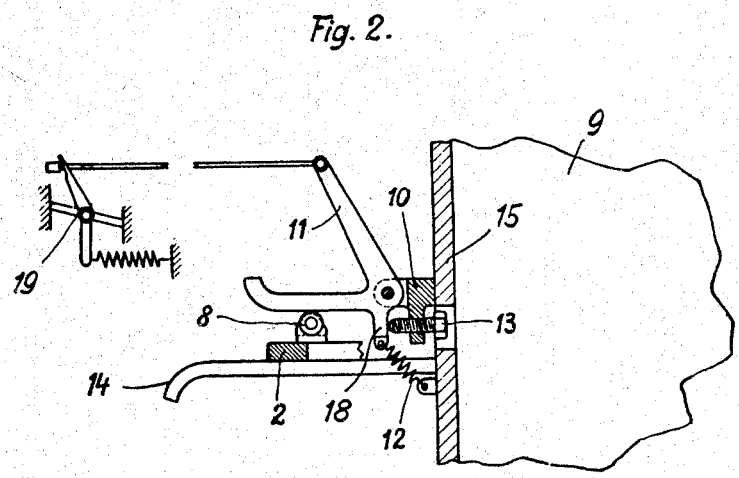

The invention is illustrated in the annexed drawing, in which Fig. 1 is a side elevation and Fig. 2, a sectional view taken on line II—II of Fig. 1.

According to the drawing the controlling treadle of the motor vehicle comprises a pedal plate 1 provided with upright side borders 16 and attached to a brake lever 2. This lever after having crossed the dashboard 15 extends with a sharp backwards bend towards the brake shaft 3 beneath the vehicle's floor where it is formed with an eye 7 sleeved loosely to a stud bolt 6 held rigidly fast in a hub piece 4, which is clamped to the brake shaft provided with the brake lever 17. By this arrangement the brake lever 2, while being adapted to be swung in a plane perpendicular to the brake shaft and to operate thereby this shaft, is enabled also to be swung in a transverse direction. But this latter movement is limited on one side by a rigid guide rail 14 alongside of which lever 2 slides when swinging to operate the brake and on the other side by the contact with an arm of an angular lever 11 which, is intended for the gas control and swinging in a horizontal plane is pivotally held by a bracket 10 attached to the outside of the dashboard 15. A friction roller 8 mounted on lever 2 takes up the contact with one arm of lever 11. This contact is kept assured by a spring 12 connecting a short arm 18 of lever 11 with the dashboard, while the position of rest is determined by an adjusting screw 13 which is held by the bracket 10 and is serving as abutment for the short arm 18. A third arm of lever 11 is connected to the gas control mechanism 19.

The mechanism as described permits the control by one and the same pedal of both the admission of gas to the motor and the working of the brake, the brake being controlled by a rocking movement of lever 2 in a vertical longitudinal plane and the gas admission by a one-sided swinging movement of said lever side ways.

What I claim is:—

1. In a pedal arrangement for the control of the gas admission and of the brake in motor vehicles and in combination, the dashboard, a backwardly bent brake lever crossing the dashboard and provided at one end with a pedal plate having upright side borders and at the other end with an eye, a transverse brake shaft beneath the floor of the vehicle, a brake lever carried by this shaft and a hub-piece clamped to the shaft, a stud bolt held rigidly fast by said hub piece and forming the pivot for the eye of the brake lever for its swinging in a transverse direction, a guide rail limiting the transverse movement of the brake lever on one side and a three armed lever pivoted to the dashboard and held with one arm in contact with the other side of the brake lever, the second arm being connected to the gas control device, and a tension spring attached to the dashboard connected to the third arm of said three armed lever.

2. In a pedal arrangement according to claim 1, an adjustable abutment screw in contact with the third arm of the three armed lever to assure the position of rest of the same.

GUSTAV GYGER.